(No Model.)

E. H. GRAVES.
ARMOR FOR CYCLE TIRES.

No. 595,099. Patented Dec. 7, 1897.

Witnesses
Chas. H. Smith
J. Staib

Inventor
Edwin H. Graves
per L. W. Serrell & Son
Attys.

UNITED STATES PATENT OFFICE.

EDWIN H. GRAVES, OF HOBOKEN, NEW JERSEY.

ARMOR FOR CYCLE-TIRES.

SPECIFICATION forming part of Letters Patent No. 595,099, dated December 7, 1897.

Application filed June 23, 1897. Serial No. 641,894. (No model.)

*To all whom it may concern:*

Be it known that I, EDWIN H. GRAVES, a citizen of the United States, residing at Hoboken, in the county of Bergen and State of New Jersey, have invented an Improvement in Armor for Cycle-Tires, of which the following is a specification.

The pneumatic tires of cycle-wheels are liable to be penetrated by tacks, pieces of glass, or other sharp substances upon the roadway, and efforts have been made to protect such pneumatic tires by shields composed of scales or of flat chains, helices, or nettings; but with the chains the interstices are of a size to freely admit the passage of a tack-point or similar sharp tapering instrument.

In armor for flexible tubing round-wire links have been used, in which each link passes the wires of the four adjacent links; but such links, being of round wire, leave comparatively large interstices, and the movements of the links, due to pressure upon the armor, are liable to chafe and injure the rubber or other material of the pneumatic tire, and this difficulty also exists in cases where the flat chain is embedded in the rubber itself.

In the present invention I make use of circular links, of sheet metal, with the openings in the links only sufficiently large for passing the metal of the adjacent links, and in consequence of there being portions of four links passing through the hole in each link and one pair of links lapping over the next pair of links peripherally the interstices are reduced to a minimum, so that the armor is substantially continuous and adapted to resist puncture by any sharp article—such as a tack, piece of glass, or similar substance—and I make the links upon the edges of the chain armor smaller, so that these links will take the tension when the tire is inflated, and thereby the chain armor will be reliably held upon the convexity of the inflated tire, and it will not be liable to come off when in use, even without any fastening passing around within the felly, and the intermediate links of the chain will be sufficiently free to easily accommodate themselves to the surface of the roadway on one side and the surface of the pneumatic tire on the other side without risk of injuring such pneumatic tire.

Figure 2:
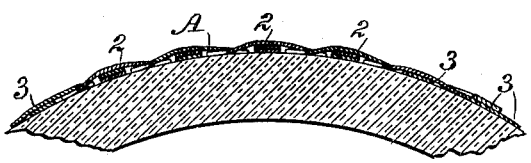
Figure 1:
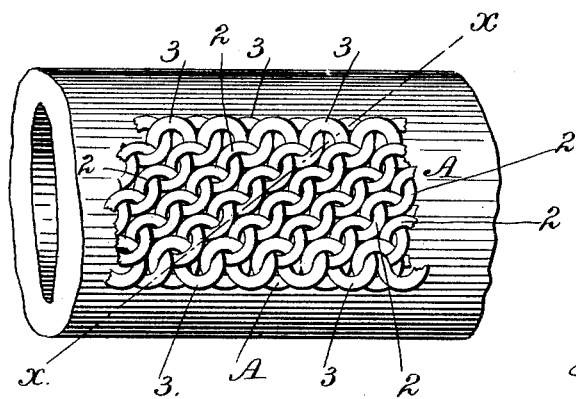

In the drawings, Figure 1 is a plan view of a portion of a tire with a chain armor upon it, and Fig. 2 is a cross-section of the armor at the line $x$ $x$ in larger size.

The pneumatic tire is to be of any desired character, and the chain may be upon the outside of the shoe or tube, or it may be outside of the pneumatic tube and between the same and the shoe. I have, however, represented the armor upon the outside of a tubular tire, and I remark that, if desired, this armor may be inclosed with a fabric of rubber or similar material, as has heretofore been done with armor for cycle-tubes.

The chain A is composed of body-links 2 and with edge-links 3. All the links are cut out from sheet metal of suitable thickness, but preferably sufficiently thin to be flexible, and the opening in each link is approximately twice the width of the metal of each link, so that the links, having one incision in each, so that they can be slipped one into the other, can be laid up in substantially the mode illustrated in the drawings—that is to say, with the metal of four adjacent links passing through the hole in each link, with the exception of the edge-links, through which pass only three of the adjacent links, and these edge-links 3 are to be smaller than the body-links 2 in order that the tension upon the chain as the tire is inflated may come principally upon the edge-links, and hence the chain-armor will accommodate itself to the convexity of the pneumatic tire, both circumferentially and transversely, and the tension upon the edge-links is to be such that they will hold closely around the sides of the inflated tube, and the inflation of the tube will distend the middle portions of the chain armor to a greater diameter, so as to insure the holding of the armor properly upon the inflated tire; but, if desired, lacings of any ordinary character may be applied from one edge of the armor to the other, passing within the wheel and across the inner surface of the felly or rim.

Under the tension due to the inflation of the tire the links of the armor will lie close upon the surface of the tire and the interstices will be reduced to a minimum; so that the inflated tire cannot be penetrated, even by such a sharp instrument as a tack, and when in use the links of the chain freely accommodate themselves to the substantially flat surface of the roadway, and should the chain armor become loose in consequence of the links wearing it will only be necessary to remove one or more rows of links across the chain and reconnect the ends of the chain armor.

I claim as my invention—

1. The chain armor for cycle-tubes composed of flat links of sheet metal, each link having an opening approximately equal to half its diameter, so that the adjacent links of the armor passing through the openings close, or nearly so, the interstices so as to prevent the penetration of any sharp instrument, and thereby protect the pneumatic tire from injury, substantially as set forth.

2. The combination in a chain armor for cycle-tubes, of plate-links forming a flat chain and smaller edge-links, whereby the tension upon the armor-chain by the inflation of the cycle-tube is taken principally upon the edge-links for holding the armor upon the inflated tube, substantially as set forth.

3. An armor for inflated cycle-tires, composed of circular thin plate-links, each link having an opening through it that is approximately twice the measurement of the width of the metal, the links being laid together so that the metal of four adjacent links passes through the opening in each link, and edge-links that are smaller and receive through them the metal of the three adjacent links and upon which edge-links the principal tension comes as the tire is inflated, substantially as set forth.

Signed by me this 16th day of June, 1897.

EDWIN H. GRAVES.

Witnesses:
   GEO. T. PINCKNEY,
   S. T. HAVILAND.